US009634961B2

(12) United States Patent
McCaughan et al.

(10) Patent No.: US 9,634,961 B2
(45) Date of Patent: Apr. 25, 2017

(54) AUTOMATED CONFIGURATION OF NETWORK DEVICE

(71) Applicants: Allied Telesis Holdings Kabushiki Kaisha, Tokyo (JP); ALLIED TELESIS, INC., Bothell, WA (US)

(72) Inventors: Geoffrey Douglas McCaughan, Rangoria (NZ); Graeme Keith Campbell, Christchurch (NZ); Martin Andrew Hill, Christchurch (NZ)

(73) Assignee: Allied Telesis Holdings Kabushiki Kaisha, Tokyo (JP)

(*) Notice: Subject to any disclaimer, the term of this patent is extended or adjusted under 35 U.S.C. 154(b) by 84 days.

(21) Appl. No.: 14/604,462

(22) Filed: Jan. 23, 2015

(65) Prior Publication Data
US 2016/0182407 A1 Jun. 23, 2016

Related U.S. Application Data

(60) Provisional application No. 62/094,019, filed on Dec. 18, 2014.

(51) Int. Cl.
H04L 12/939 (2013.01)
H04L 29/08 (2006.01)
(Continued)

(52) U.S. Cl.
CPC ........ *H04L 49/557* (2013.01); *H04L 41/0668* (2013.01); *H04L 45/22* (2013.01); *H04L 69/324* (2013.01)

(58) Field of Classification Search
CPC ......... H04L 49/00; H04L 45/00; H04L 41/00; H04L 49/557; H04L 45/22; H04L 41/0668
See application file for complete search history.

(56) References Cited

U.S. PATENT DOCUMENTS 7,469,279 B1* 12/2008 Stamler ............... H04L 41/0672 709/220
8,331,263 B2 12/2012 Dow
(Continued)

FOREIGN PATENT DOCUMENTS

EP 2337275 6/2001
EP 2112788 A1 10/2009
(Continued)

OTHER PUBLICATIONS

K. Watsen, et al, "Zero Touch Provisioning for NETCONF Call Home (ZeroTouch)", NETCONF Working Group Internet-Draft, Jul. 1, 2014, accessed Jul. 25, 2014 (tools.ietf.org/html/draft-ietf-netconf-zerotouch-00).
(Continued)

Primary Examiner — Andrew Lai
Assistant Examiner — Sumitra Ganguly
(74) Attorney, Agent, or Firm — Brooks Acordia IP Law, P.C.; Michael Zarrabian

(57) ABSTRACT

Some embodiments provide a system that includes a backup device and a plurality of switches coupled to the backup device. A switch in the plurality of switches may be coupled to the backup device using at least a special link. The at least special link may be configured by a replacement device when the switch coupled to the backup device using the at least the special link fails, the failed switch is replaced with the replacement device, and the replacement device receives configuration data associated with the special link from another switch of the plurality of switches via a simple link. The simple link may allow communication of data without configuration of the simple link. The backup device may be configured to manage backup data associated with the plurality of switches.

20 Claims, 13 Drawing Sheets

(51) Int. Cl.
*H04L 12/707* (2013.01)
*H04L 12/24* (2006.01)

(56) References Cited

U.S. PATENT DOCUMENTS

| | | |
|---|---|---|
| 2003/0131311 A1 | 7/2003 | McNamara |
| 2006/0038688 A1 | 2/2006 | Nakamura |
| 2006/0265482 A1 | 11/2006 | Trisno et al. |
| 2008/0126857 A1 | 5/2008 | Basham |
| 2009/0222543 A1 | 9/2009 | Tannenbaum et al. |
| 2010/0074099 A1* | 3/2010 | Balasubramanian . H04W 24/04 370/219 |
| 2010/0124176 A1 | 5/2010 | Fan et al. |
| 2010/0180016 A1* | 7/2010 | Bugwadia ............. G06F 9/4411 709/220 |
| 2010/0306352 A1 | 12/2010 | Pritikin |
| 2013/0188521 A1* | 7/2013 | Jain ..................... H04L 12/185 370/255 |

FOREIGN PATENT DOCUMENTS

| | | |
|---|---|---|
| KR | 20020038880 | 5/2005 |
| WO | 2005053178 | 6/2005 |

OTHER PUBLICATIONS

Manual for Remote Control, www.teamview.com, Jan. 30, 2011, 84 pages.

* cited by examiner

AUTOMATED CONFIGURATION OF NETWORK DEVICE

RELATED APPLICATIONS

This application claims the benefit of and priority to U.S. Provisional Patent Application No. 62/094,019, filed 18 Dec. 2014, titled "AUTOMATED CONFIGURATION OF NETWORK DEVICE" by Graeme Keith Campbell, et al., which is incorporated by reference herein.

This application is related to U.S. application Ser. No. 14/446,235, entitled 'PROVISIONING', by Graeme Keith Campbell et al, filed 29 Jul. 2014. The related application is incorporated by reference herein.

BACKGROUND

Networking devices (e.g., switches, routers, bridges, etc.) used for deploying large networks usually have customized configurations and/or are configured manually. Networking device in such large networks may fail and need to be replaced or reconfigured by another networking device. Typically, configuring the replacement networking device or reconfiguring of the failed device is performed manually to function the same and/or similar to the failed networking device.

SUMMARY

Accordingly, a need has arisen to automatically configure replacement devices or reconfigure failed devices in a management network without human intervention. For example, a need has arisen to distribute special link configuration information of a node in the management network to adjacent nodes in the management network so that a device replacing the node may establish the special link and communicate with a backup device in the management network.

In some embodiments, a system includes a backup device and a plurality of switches coupled to the backup device. A switch in the plurality of switches may be coupled to the backup device using at least a special link. The at least the special link may be configured by a replacement device when the switch coupled to the backup device using the at least the special link fails, the failed switch is replaced with the replacement device, and the replacement device receives configuration data associated with the special link from another switch of the plurality of switches via a simple link. The simple link may allow communication of data without configuration of the simple link. The backup device may be configured to manage backup data associated with the plurality of switches.

In some embodiments, the system further includes the replacement device for replacing the failed switch. The replacement device may be configured to receive backup data of the switch in the plurality of switches from the backup device. The replacement device may be further configured to automatically configure itself without human intervention based on the backup data of the switch in the plurality of switches.

In some embodiments, the system further includes a master node that is configured to manage the plurality of switches. The another switch in the plurality of switches may be configured to send the configuration information regarding the special link to the replacement device in response to addition of the replacement device to the system. The addition of the replacement device to the system may include plugging connections coupled to the switch in the plurality of switches into the replacement device and powering on the replacement device.

The backup device may manage backup data of the plurality of switches by requesting backup data from the plurality of switches and storing the backup data for later retrieval. It is appreciated that the special link may be a link established using a link aggregation control protocol (LACP). It is also appreciated that the special link may be a link established using a layer 2 tunneling protocol (L2TP). It is further appreciated that the backup device and the plurality of switches may be part of a network that is a loop-free broadcast domain. In some embodiments, the backup data associated with the plurality of switches may include configuration data, firmware data, and licensing data.

In some embodiments, a device includes a first interface and a second interface. The first interface may be for connecting to an adjacent node in a management network via a simple link. The first interface may be further for obtaining configuration information regarding the special link from the adjacent node. The special link may be a link that is configured before data is communicated over the special link. The second interface may be for establishing the special link with a node in the management network based on the configuration information regarding the special link. The second interface may be further for receiving backup data of a failed node in the management network from a backup device in the management network. The second interface may be further for configuring the device to operate as the failed node in the management network based on the backup data of the failed node.

The first interface may be further for receiving identification information from the adjacent node. The device may determine that the device is a replacement for the failed node in the management network. The first interface may be further for receiving a notification that configuration information regarding the special link is available from the adjacent node. The configuration information regarding the special link may be obtained in response to the notification. Configuring the device may include automatically configuring the device without human intervention. The device and the adjacent node may be connected via a link that allows communication of data over the link without configuration of the link.

In some embodiments, a method includes detecting an addition of a device in the management network as a replacement device for a failed node in the management network. The method also includes sending identification information to the device indicating that the device is a replacement for the failed node. The method further includes sending a notification that configuration information regarding a special link is available from the node, wherein the special link is a link along a path between the device and a backup device in the management network that is configured before data is communicated over the special link. The method additionally includes sending the configuration information regarding the special link to the device, wherein the configuration information regarding the special link is for the device to establish the special link to allow communication with the backup device.

The method may further comprise receiving a request for the configuration information regarding the special link. The configuration information regarding the special link may be sent in response to the request. The node and the device may be connected via a link that allows communication of data over the link without configuration of the link.

These and various other features and advantages will be apparent from a reading of the following detailed description.

BRIEF DESCRIPTION OF DRAWINGS

The embodiments are illustrated by way of example, and not by way of limitation, in the figures of the accompanying drawings and in which like reference numerals refer to similar elements.

DETAILED DESCRIPTION

Figure 1A:
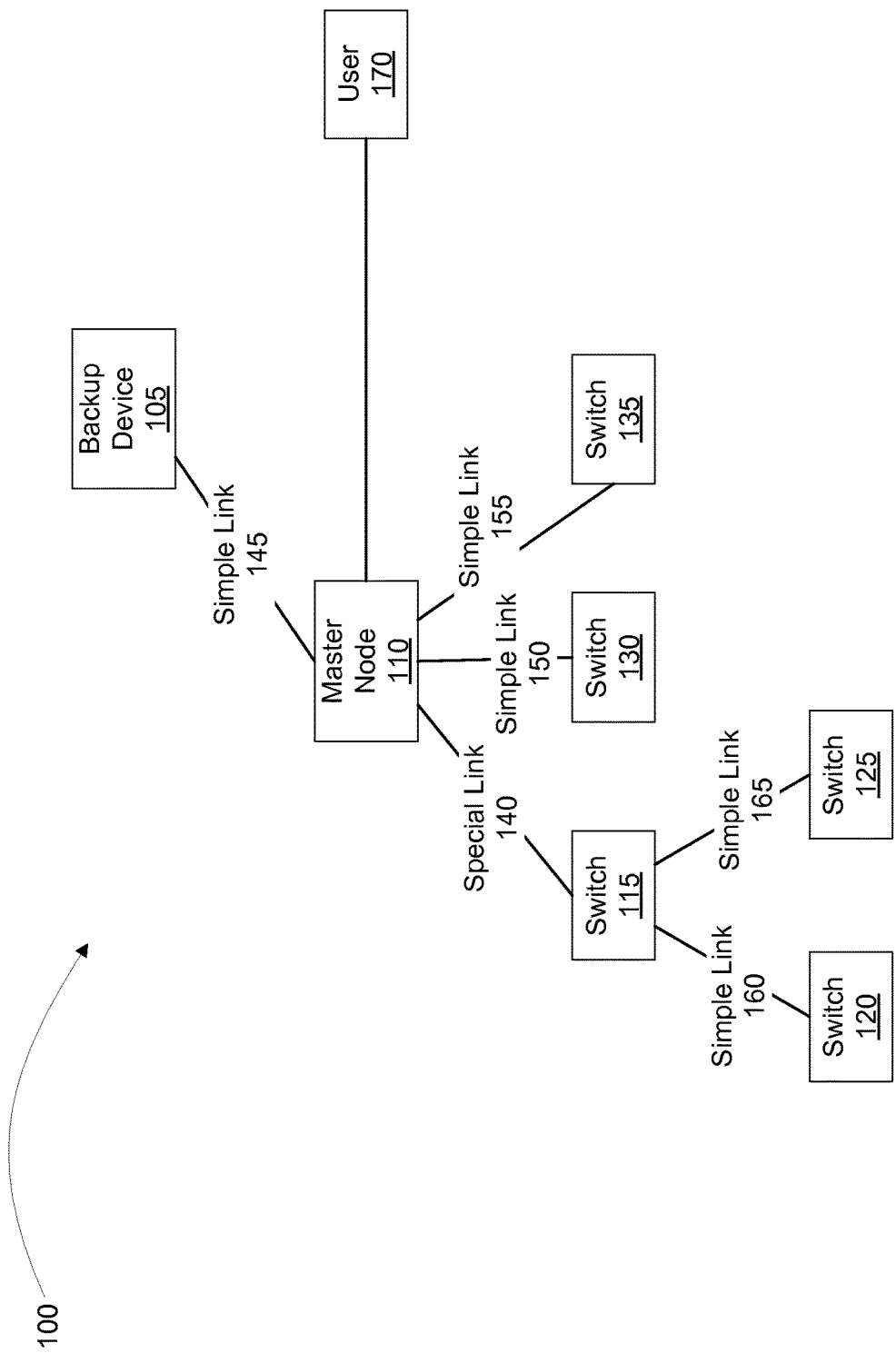
FIGS. 1A-1C show replacement of a failed device in a management network in accordance with some embodiments.

Reference will now be made in detail to various embodiments, examples of which are illustrated in the accompanying drawings. While various embodiments are described herein, it will be understood that these various embodiments are not intended to limit the scope of the embodiments. On the contrary, the embodiments are intended to cover alternatives, modifications, and equivalents, which may be included within the scope of the embodiments as construed according to the appended Claims. Furthermore, in the following detailed description of various embodiments, numerous specific details are set forth in order to provide a thorough understanding of the concept. However, it will be evident to one of ordinary skill in the art that the concept may be practiced without these specific details. In other instances, well known methods, procedures, components, and circuits have not been described in detail as not to unnecessarily obscure aspects of the concept and embodiments.

Some portions of the detailed descriptions that follow are presented in terms of procedures, logic blocks, processing, and other symbolic representations of operations on data bits within a computer memory. These descriptions and representations are the means used by those skilled in the data processing arts and data communication arts to most effectively convey the substance of their work to others skilled in the art. In the present application, a procedure, logic block, process, or the like, is conceived to be a self-consistent sequence of operations or steps or instructions leading to a desired result. The operations or steps are those utilizing physical manipulations of physical quantities. Usually, although not necessarily, these quantities take the form of electrical or magnetic signals capable of being stored, transferred, combined, compared, and otherwise manipulated in an electronic device, a computer system or computing device. It has proven convenient at times, principally for reasons of common usage, to refer to these signals as transactions, bits, values, elements, symbols, characters, samples, pixels, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present disclosure, discussions utilizing terms such as "receiving," "determining," "generating," "obtaining," "retrieving," "establishing," "sending," "transmitting," "communicating," "providing," "associating," "configuring," "detecting," "updating," "modifying" or the like, refer to actions and processes of a computer system or similar electronic computing device or processor. The computer system or similar electronic computing device manipulates and transforms data represented as physical (electronic) quantities within the computer system memories, registers or other such information storage, transmission or display devices.

It is appreciated that present systems and methods can be implemented in a variety of architectures and configurations. For example, present systems and methods can be implemented as part of a distributed computing environment, a cloud computing environment, a client server environment, etc. Embodiments described herein may be discussed in the general context of machine-executable instructions residing on some form of machine-readable storage medium, such as program modules, executed by one or more computers, computing devices, or other devices. By way of example, and not limitation, machine-readable storage media may comprise computer storage media and communication media. Generally, program modules include routines, programs, objects, components, data structures, etc., that perform particular tasks or implement particular abstract data types. The functionality of the program modules may be combined or distributed as desired in various embodiments.

Computer storage media can include volatile and non-volatile, removable and non-removable media implemented in any method or technology for storage of information such as machine-readable instructions, data structures, program modules, or other data. Computer storage media can include, but is not limited to, random access memory (RAM), read only memory (ROM), electrically erasable programmable ROM (EEPROM), flash memory, or other memory technology, compact disk ROM (CD-ROM), digital versatile disks (DVDs) or other optical storage, magnetic cassettes, magnetic tape, magnetic disk storage or other magnetic storage devices, or any other medium that can be used to store the desired information and that can be accessed to retrieve that information.

Communication media can embody computer-executable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media can include wired media such as a wired network or direct-wired connection, and wireless media such as acoustic, radio frequency (RF), infrared and other wireless media. Combinations of any of the above can also be included within the scope of machine-readable storage media.

Embodiments described herein are directed to automatic configuration of replacement devices and/or reconfiguration of failed devices in a management network without human intervention. In some embodiments, a node in the management network distributes special link configuration information of the node to adjacent nodes in the management network that are connected to the node via simple links. When the device at the node that distributes special link configuration information of the node to the adjacent nodes fails, a new device may replace the failed device at the failed node. The new device may establish the special link and communicate with a backup device, e.g., a device of one of the adjacent nodes, in the management network. This way, the new device replacing the failed device at the failed node may receive special link configuration information from an adjacent node and establish a special link and communicate with a backup device in order to automatically configure itself to operate as the new device replacing the failed device at the failed node.

Figure 1B:
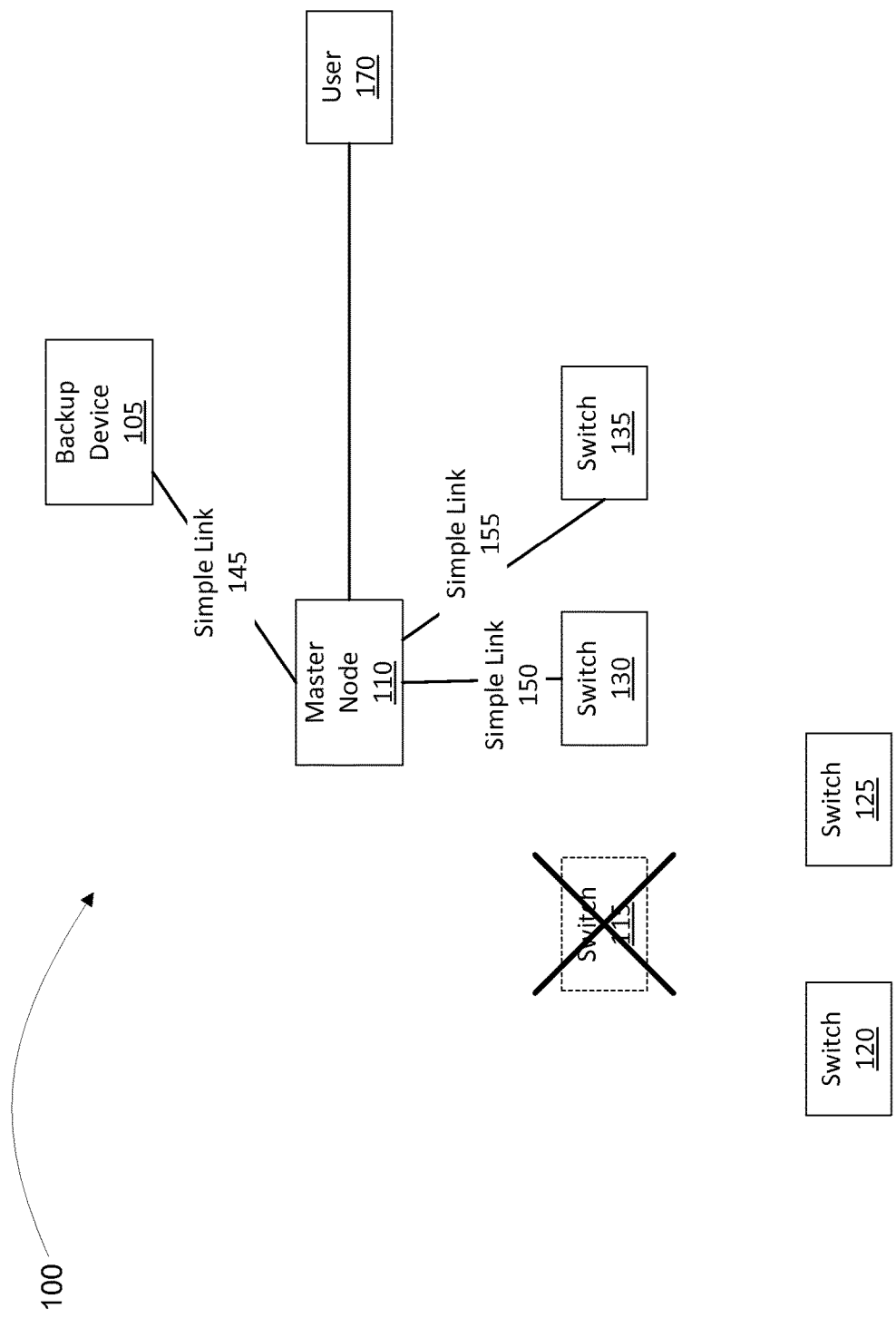
Figure 1C:
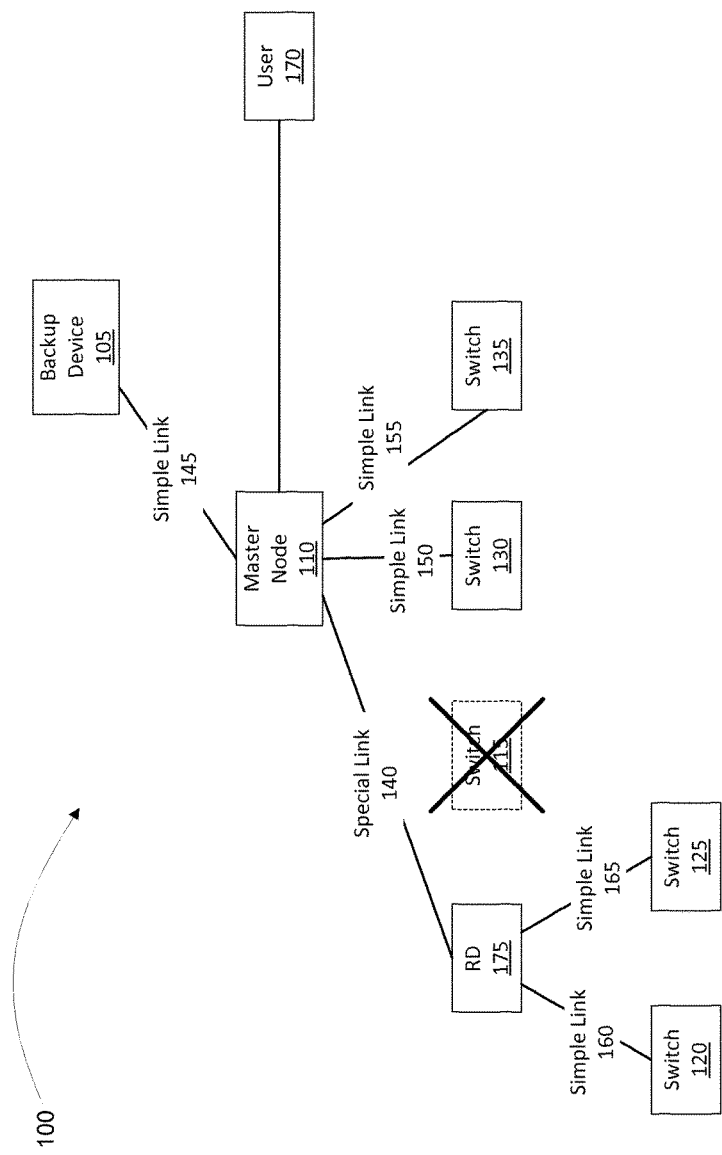

FIGS. 1A-1C show replacement of a device in a management network in accordance with some embodiments. Specifically, FIG. 1A illustrates a network architecture of a management network, FIG. 1B illustrates a failure of a device in the management network, and FIG. 1C illustrates a device added to the management network to replace the failed device.

Referring now to FIG. 1A, a network architecture of management network 100 is shown in accordance with some embodiments. As illustrated, management network 100 (also referred to as a management plane network) includes a backup device 105, a master node 110, and switches 115, 120, 125, 130, and 135. In some embodiments management network 100 is a loop-free broadcast domain. It is appreciated that a loop-free broadcast domain may be implemented using any number of different networking technologies, e.g., spanning tree protocol (STP) technologies, networking technologies described in commonly-owned United States Patent Publication 2014/0036661, filed Jan. 30, 2013, etc. United States Patent Publication 2014/0036661 is incorporated herein by reference.

Backup device 105 is a node that manages backup data of devices in management network 100. For instance, backup device 105 may request for, retrieve, and store backup data from master node 110 and switches 115, 120, 125, 130, and 135. In some embodiments, backup device 105 requests for backup data from master node 110 and switches 115, 120, 125, 130, and/or 135 at specified intervals (e.g., once a day, once a week, once a month, etc.), upon a change to the configuration of master node 110 and switches 115, 120, 125, 130, and/or 135, upon powering up of master node 110 and switches 115, 120, 125, 130, and/or 135, or any combination thereof. Backup data of a node in management network 100 includes, in some embodiments, all the data (e.g., configuration data, firmware data, licensing data, user scripting data, etc.) on the node and data regarding the state of the node. In addition, backup device 105 may send backup data to devices (also referred to as replacement devices) added to management network 100 to replace failed nodes in management network 100. This way, the replacement devices may perform the same or similar functionalities as the failed nodes and thus the operation of management network 100 is maintained.

Master node 110 is a node that may manage (e.g., monitor, configure, update, modify, etc.) switches in management network 100. In this example, master node 110 manages switches 115, 120, 125, 130, and 135. In some embodiments, master node 110 may receive requests from backup device 105 for backup data associated switches 115, 120, 125, 130, and/or 135. In response to such requests, master node 110 instructs switches 115, 120, 125, 130, and/or 135 to send their respective backup data to the backup device 105 via master node 110. Master node 110 may also receive commands and/or instructions from user 170 (e.g., a network manager) regarding the management of switches 115, 120, 125, 130, and 130. In some embodiments, master node 110 provides an interface (e.g., a command line interface (CLI), a graphical user interface (GUI), etc.,) through which user 170 manages switches 115, 120, 125, 130, and 135. In some embodiments, master node 110 is implemented as a network switch (e.g., a layer 2 and/or layer 3 network switch), a computing device, a server, etc.

Switches 115, 120, 125, 130, and 135 are network switches (e.g., layer 2 and/or layer 3 network switches) that may forward and/or route network data (e.g., packets) to nodes (e.g., master node 110 and/or other networking devices not shown) and/or hosts (not shown) in management network 100. Switches 115, 120, 125, 130, and 135 may be managed by master node 110. For instance, switches 115, 120, 125, 130, and 135 may receive instructions and/or commands from master node 110 (which may have received such instructions and/or commands from user 170) regarding the manner in which to forward and/or route network data through management network 100.

As shown in FIG. 1A, master node 110 is communicatively coupled to switch 115 through special link 140. In some embodiments, special link 140 is a link that is configured before network data may be communicated over special link 140. In this example, master node 110 and switch 115 are configured to establish special link 140 before master node 110 and switch 115 may communicate network data over special link 140. Examples of such a link include a link established using link aggregation control protocol (LACP), a link established using layer 2 tunneling protocol (L2TP) for communicating layer 2 data over a layer 3 network (not shown), etc. It is appreciated that a special link (e.g., special link 140) connecting one node (e.g., switch 115) with another node (e.g., master node 110) is connected through respective interfaces (e.g., network interfaces such as Ethernet interfaces) of the one node and the other node.

FIG. 1A also illustrates that nodes in management network 100 are connected via simple links. Specifically, master node 110 and backup device 105 are connected via simple link 145, master node 110 and switch 130 are connected via simple link 150, master node 110 and switch 135 are connected via simple link 155, switches 115 and 120 are connected via simple link 160, and switches 115 and 125 are connected via simple link 165. In some embodiments, simple links 145, 150, 155, 160, and 165 are links over which network data may be communicated without any configuration. As an example, simple links 145, 150, 155, 160, and 165 may be physical Ethernet links. It is appreciated that simple links 145, 150, 155, 160, and 165 connecting backup device 105, master node 110, and switches 115, 120, 125, 130, and 135 are connected through respective interfaces (e.g., network interfaces such as Ethernet interfaces) of backup device 105, master node 110, and switches 115, 120, 125, 130, and 135. For example, simple link 160 connecting switch 115 with switch 120 is connected through respective interfaces of switch 115 and switch 120.

In some embodiments, a node that is configured to communicate over a special link distributes configuration information regarding the special link (also referred to as special link configuration information) to other nodes (referred to as adjacent nodes) connected to the node via simple links.

Referring to FIG. 1A as an example, switch 115 distributes special link configuration information regarding special link 140 to switches 120 and 125 over simple links 160 and 165, respectively. Similarly, master node 110 distributes special link configuration information regarding special link 140 to switches 130 and 135 over simple links 150 and 155, respectively. In some embodiments, a node that is configured to communicate over a special link distributes special link configuration information to adjacent nodes at specified intervals (e.g., once a day, once a week, etc.), upon a change to the configuration of the special link, upon establishing the special link, or any combination thereof.

Special link configuration information may include any number of different configuration information for configuring and/or establishing a special link (e.g., special link 140). For example, a special link (e.g., special link 140) may be a layer 2 over layer 3 tunnel link, the layer 3 link may include configuration information of a routing protocol, and the routing protocol may include configuration information for configuring a different link. In such a case, the special link configuration information includes configuration information for configuring the layer 2 over layer 3 tunnel link, configuration information for configuring the routing protocol over the layer 3 link, and configuration information for configuring the different link. It is appreciated that the special link configuration information may include any number of additional and/or different configuration information so that a replacement device (e.g., replacement device 175) may configure a special link (e.g., special link 140) associated with the special link configuration information.

Referring now to FIG. 1B, a failure of switch 115 in management network 100 is shown in accordance with some embodiments. It is appreciated that a switch in management network 100 may fail for any number of reasons. For example, a switch in management network 100 is determined (e.g., by master node 110) to have failed when the switch is malfunctioning (e.g., unresponsive to commands and/or instructions), performance of the switch degrades below a threshold performance level, the switch is completely non-functional (e.g., the device does not power up), etc. In this example, master node 110 determined that switch 115 has failed. In some embodiments, one or more nodes adjacent to the failed node detect that the node has failed and notifies master node 110 of the failure. For example, if switch 120 fails, switch 115 may detect that switch 120 has failed and notifies master node 110 of the failure.

Referring now to FIG. 1C, a device added to management network 100 to replace failed switch 115 is shown in accordance with some embodiments. In particular, replacement device 175, labeled "RD" is added to management network 100. In some embodiments, replacement device 175 is added to management network 100 by plugging connections (e.g., Ethernet cables) that were connected to switch 115 into replacement device 175 and powering up replacement device 175. For this example, replacement device 175 is a switch that is the same as, similar to, and/or compatible with failed switch 115.

In this example, an adjacent node (e.g., switch 120 and/or switch 125) connected to replacement device 175 via simple links notifies replacement device 175 that special link configuration information exists for replacement device 175. In response to the notification, replacement device 175 retrieves the special link configuration information from the adjacent node and uses the special link configuration information to establish the special link (e.g., special link 140). For this example, replacement device 175 establishes special link 140 with master node 110, thereby allowing communication between backup device 105 and replacement device 175. Backup device 105 sends backup data of switch 115 to replacement device 175 (via simple link 145 and special link 140). As such, replacement device 175 automatically configures itself, without any human intervention, based on the backup data of switch 115 received via special link 140. Once fully configured, replacement device 175 operates substantially the same or similar to switch 115 (e.g., by re-implementing the state of failed switch 115). In this manner, the operation of management network 100 is maintained.

Figure 2:
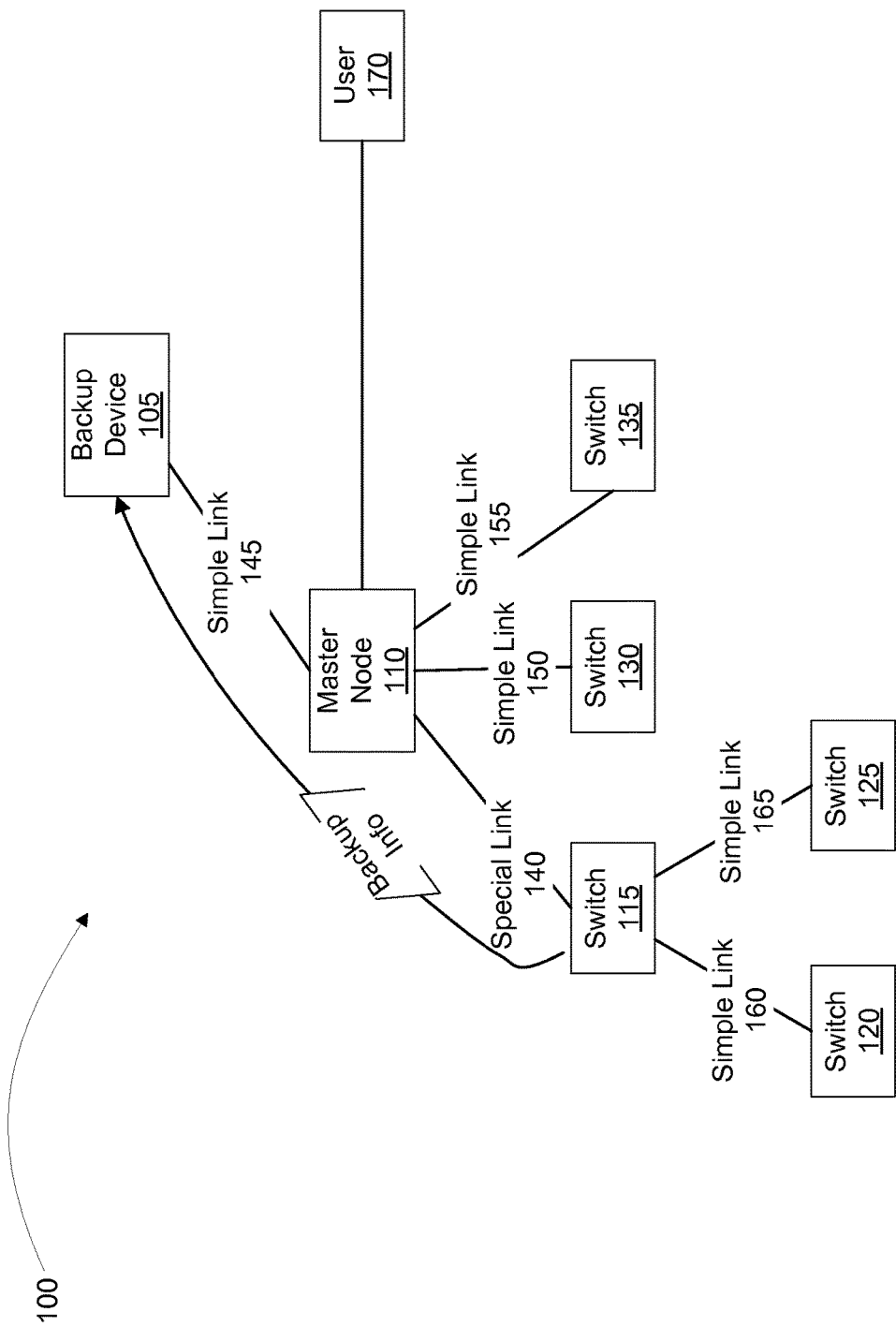
FIG. 2 shows transmission of backup data of a device to a backup device in accordance with some embodiments.

FIG. 2 shows transmission of backup data of switch 115 to backup device 105 in management network 100 in accordance with some embodiments. As mentioned above, backup device 105 may, in some embodiments, request for backup data from master node 110 and switches 115, 120, 125, 130, and/or 135 at specified intervals (e.g., once a day, once a week, once a month, etc.), upon a change to the configuration of master node 110 and switches 115, 120, 125, 130, and/or 135, upon powering up of master node 110 and switches 115, 120, 125, 130, and/or 135, or any combination thereof.

In this example, backup device 105 requests backup data from switch 115. In some embodiments, backup device 105 sends the request to master node 110 via simple link 145 and special link 140. In response to the request, switch 115 sends backup data of switch 115 to backup device 105 via special link 140 and simple link 145. In other embodiments, backup device 105 sends the request to master node 110 and master node 110, in turn, instructs switch 115 to send backup data to master node 110, which forwards the backup data to backup device 105. Backup device 105 stores the backup data of switch 115 for later retrieval by a replacement device of switch 115.

FIG. 2 illustrates an example of backing up a node in management network 100. It is appreciated that the same and/or similar operations as those described above by reference to FIG. 2 are performed for backing up other nodes (e.g., master node 110, switch 120, switch 125, switch 130, switch 135, etc.) in management network 100.

Figure 3A:
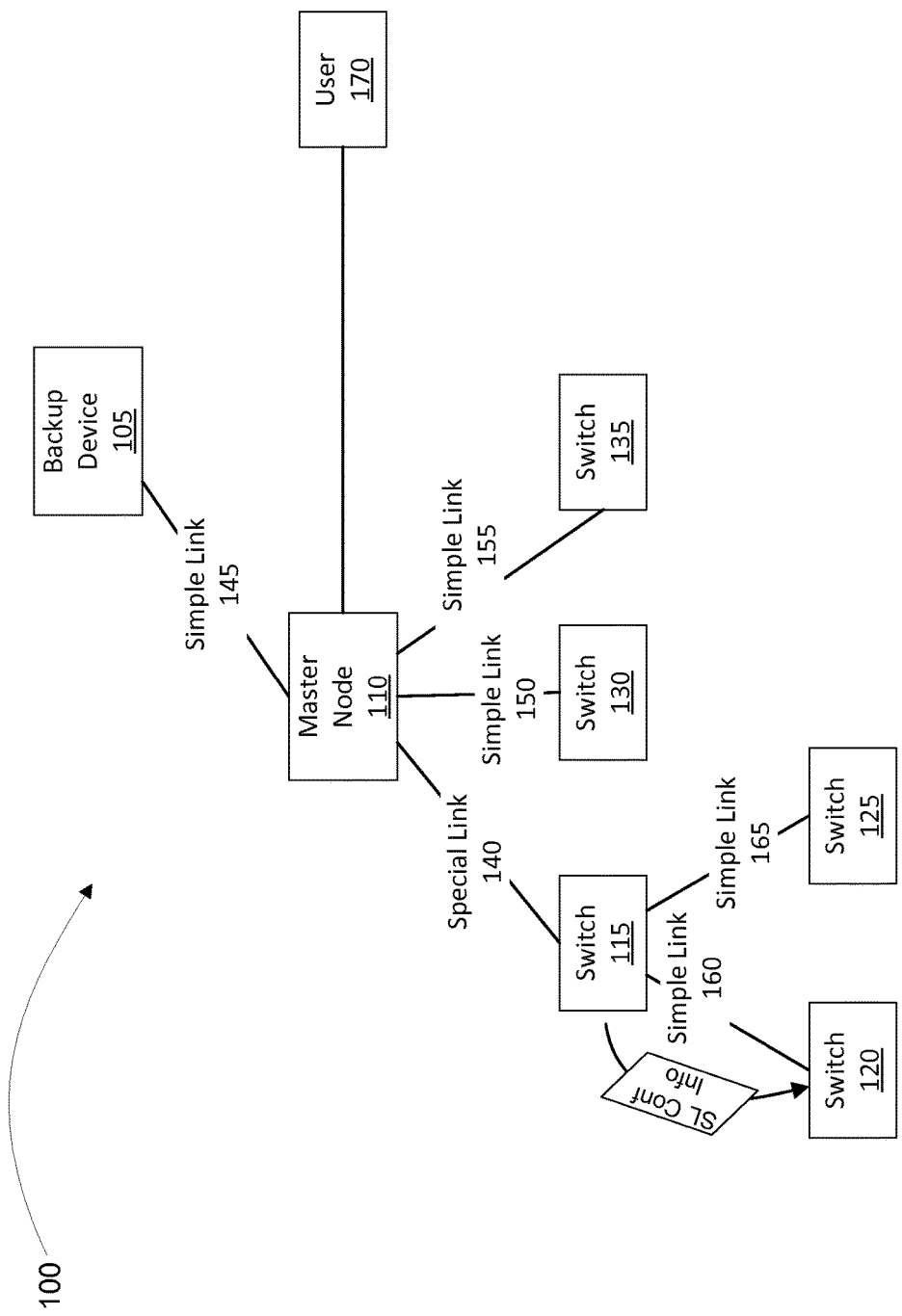
FIGS. 3A and 3B show a device in a management network distributing special link configuration information in accordance with some embodiments.
Figure 3B:
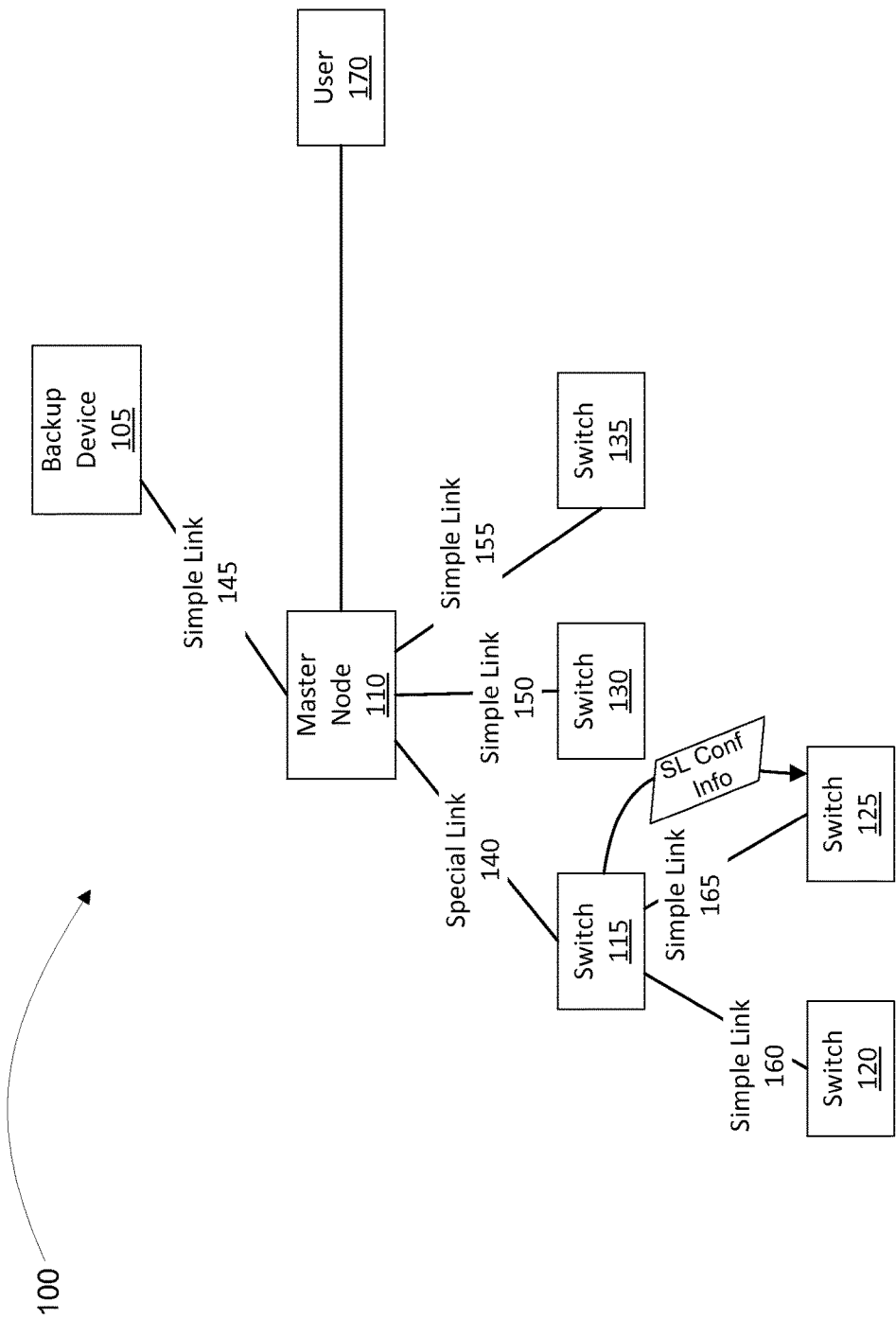

FIGS. 3A and 3B show a node in management network 100 distributing special link configuration information in accordance with some embodiments. As mentioned above, a node that is configured to communicate over a special link distributes, in some embodiments, special link configuration information to adjacent nodes. In some embodiments, a node that is configured to communicate over a special link may identify adjacent nodes in a management network using any number of different technologies (e.g., link layer discovery protocol (LLDP)) for identifying neighboring nodes.

Referring to FIG. 3A, switch 115 distributing special link configuration information to an adjacent node in management network 100 is shown in accordance with some embodiments. As illustrated, switch 115 is distributing special link configuration information, labeled "SL Conf Info", regarding special link 140 to switch 120, a node to which switch 115 is connected via simple links (e.g., simple link 160). In some embodiments, switch 120 stores the special link configuration information in a non human-readable format.

Referring now to FIG. 3B, switch 115 distributing special link configuration information to another adjacent node in management network 100 is shown in accordance with some embodiments. In this example, switch 115 is distributing special link configuration information, labeled "SL Conf Info", regarding special link 140 to switch 125, a node to which switch 115 is connected via simple links (e.g., simple link 165). In some embodiments, switch 125 stores the special link configuration information in a non human-readable format.

FIGS. 3A and 3B illustrate a node (e.g., switch 115) that is configured to communicate over a special link distributing special link configuration information to adjacent nodes (e.g., switches 120 and 125). In some embodiments, the node distributes special link configuration information to the adjacent nodes at specified intervals (e.g., once a day, once a week, etc.), upon a change to the configuration of the special link, upon establishing the special link, or any combination thereof. Moreover, it is appreciated that other nodes (e.g., master node 110) in management network 100 that are configured to communicate over a special link (e.g., special link 140) distribute special link configuration information to adjacent nodes (e.g., switches 130 and 135) in the same and/or similar manner as that described above by reference to FIGS. 3A and 3B.

Figure 4A:
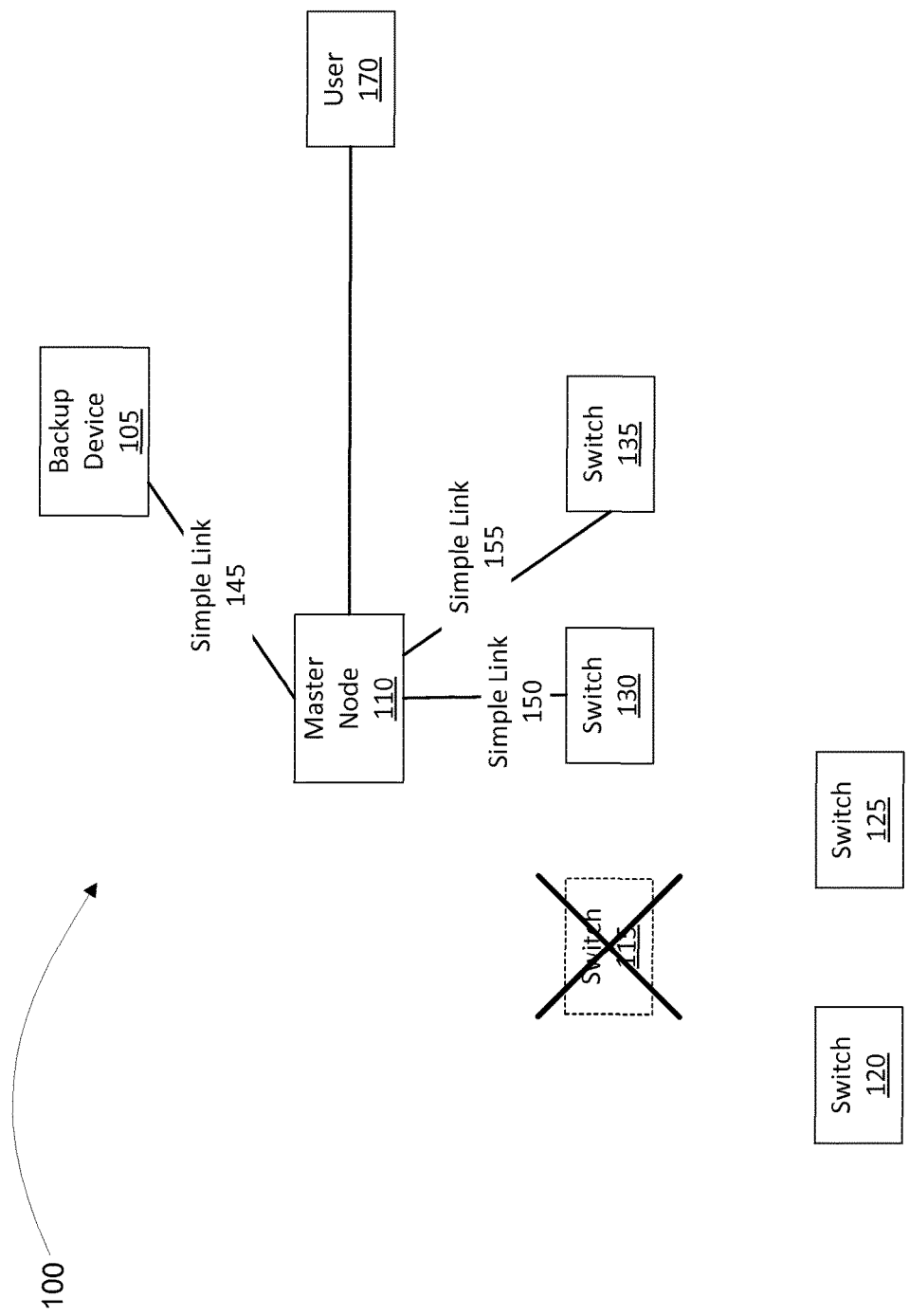
FIGS. 4A-4C show replacement of a failed device in a management network configured with a special link in accordance with some embodiments.
Figure 4B:
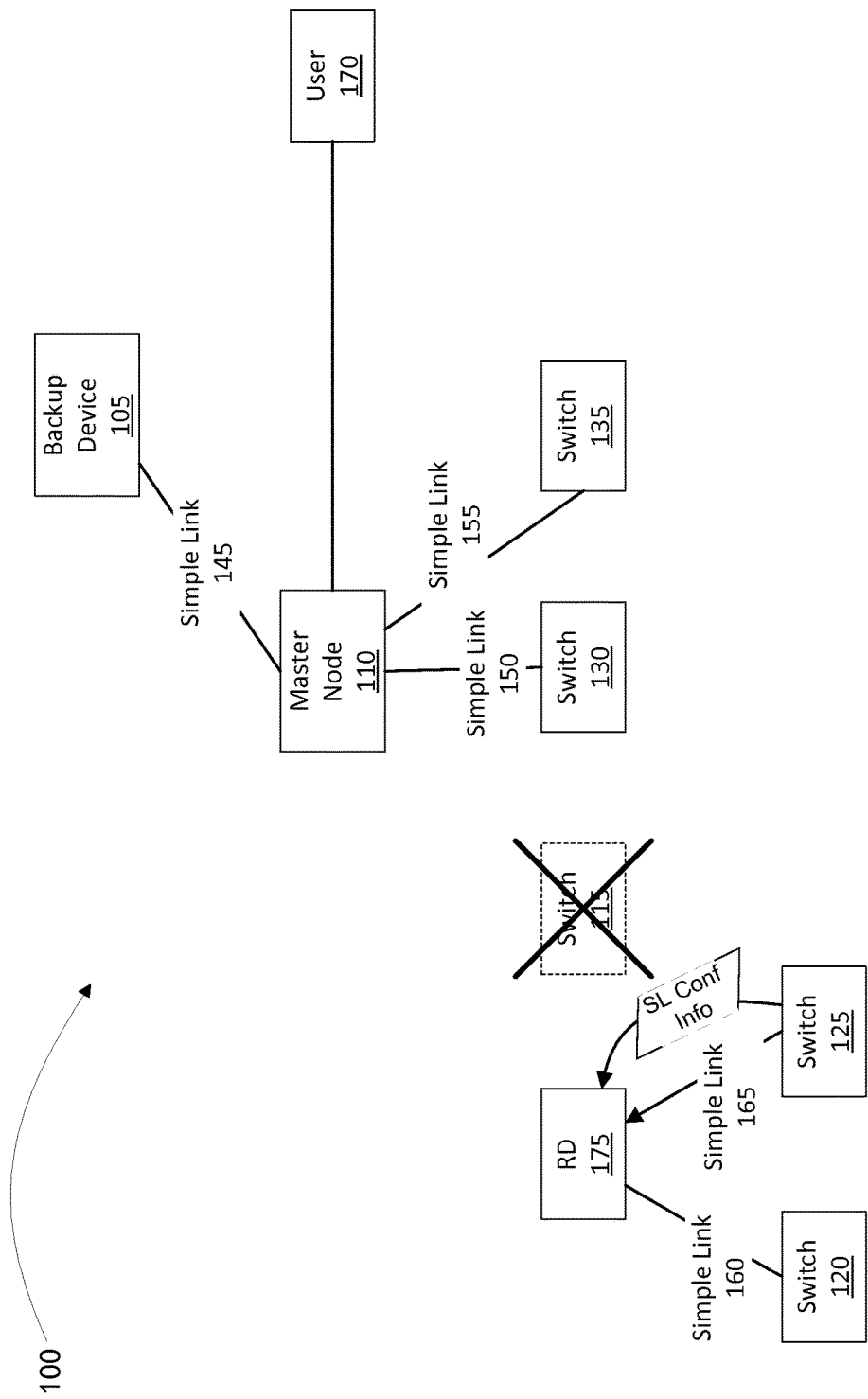
Figure 4C:
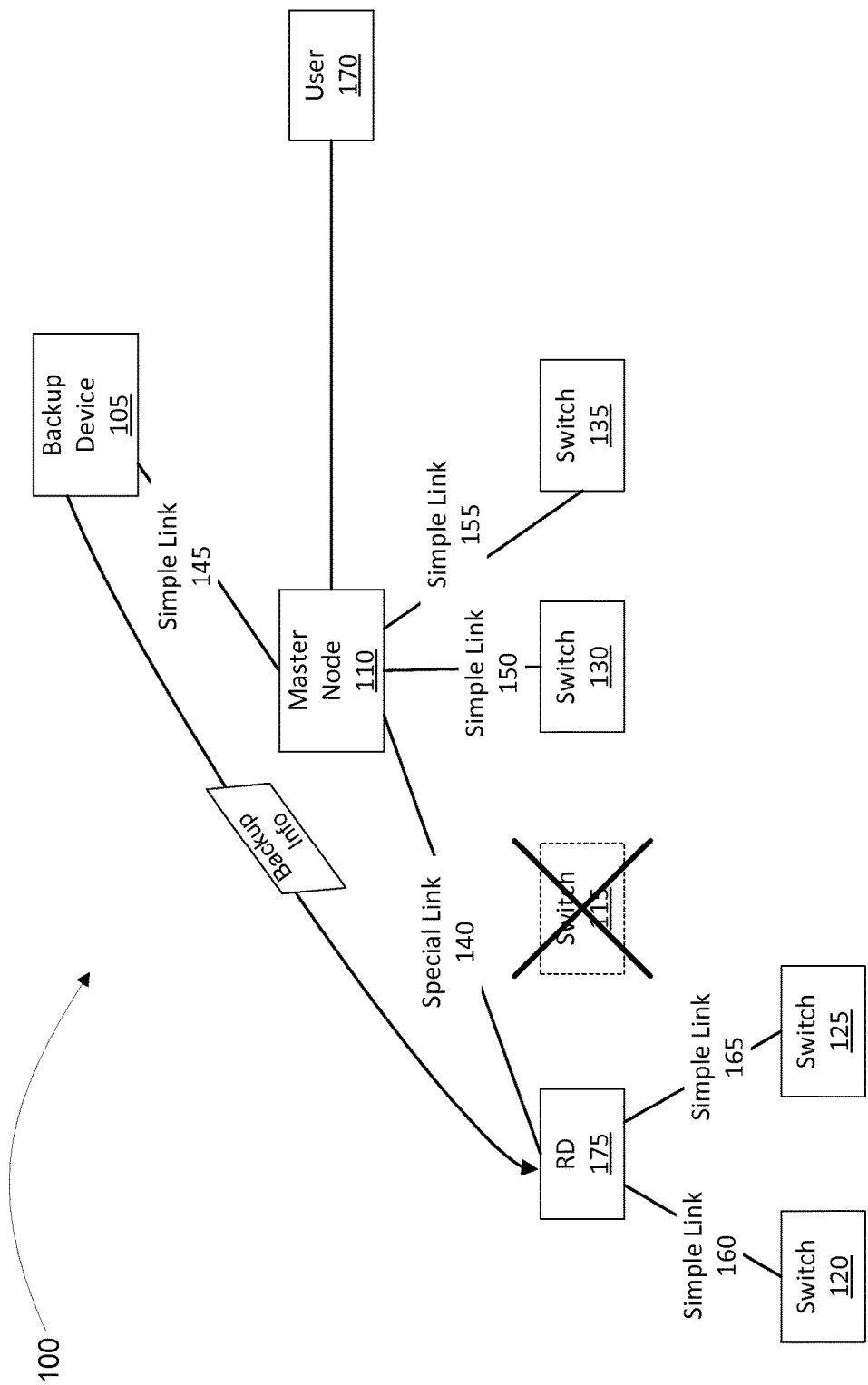

FIGS. 4A-4C show replacement of a failed device in a management network configured with a special link in accordance with some embodiments. Referring now to FIG. 4A, a failure of switch 115 in management network 100 is shown in accordance with some embodiments. As mentioned above, it is appreciated that a switch in management network 100 may fail for any number of reasons. For instance, a switch in management network 100 is determined (e.g., by master node 110) as failed when the switch is malfunctioning (e.g., unresponsive to commands and/or instructions), performance of the switch degrades below a threshold performance level, the switch is completely non-functional (e.g., the device does not power up), etc. In this example, master node 110 determined that switch 115 has failed. In some embodiments, one or more nodes adjacent to the failed node detect that the node has failed and notifies master node 110 of the failure. For example, if switch 120 fails, switch 115 may detect that switch 120 has failed and notifies master node 110 of the failure.

Referring now to FIG. 4B, a device added to management network 100 to replace failed switch 115 is shown in accordance with some embodiments. As illustrated, replacement device 175 is added to management network 100. In some embodiments, replacement device 175 is added to management network 100 by plugging connections (e.g., Ethernet cables) that were connected to switch 115 into replacement device 175 and powering up replacement device 175. For this example, replacement device 175 is a switch that is the same as, similar to, and/or compatible with failed switch 115.

FIG. 4B also shows replacement device 175 retrieving special link configuration information from an adjacent node. In this example, switch 125 detects that replacement device 175 is a replacement for failed switch 115. In some embodiments, a node (e.g., switch 120 and/or switch 125) adjacent to a replacement device (e.g., replacement device 175) detects that the replacement device is a replacement for a failed switch (e.g., switch 115) by sending packets to the replacement device. In other embodiments, a replacement device (e.g., replacement device 175) sends packets to an adjacent node (e.g., switch 120 and/or switch 125) and the adjacent node detects that the replacement device is a replacement for a failed switch (e.g., switch 115) by receiving the packets sent from the replacement device. In response to the detection, switch 125 notifies replacement device 175 via simple link 165 that special link configuration information exists for replacement device 175. In response to the notification, replacement device 175 retrieves the special link configuration information from switch 125, as illustrated in FIG. 4B. Replacement device 175 uses the special link configuration information to establish special link 140 with master node 110, thereby allowing communication between backup device 105 and replacement device 175.

Referring now to FIG. 4C, replacement device 175 being automatically configured to replace a failed node in management network 100 without human intervention is shown in accordance with some embodiments. In some embodiments, a backup device (e.g., backup device 105) detects that a replacement device (e.g., replacement device 175) is a replacement for a failed switch (e.g., switch 115) by sending packets to the replacement device. In other embodiments, a replacement device (e.g., replacement device 175) sends packets to a backup device and/or a master node (e.g., backup device 105 and/or master node 110) and the backup device and/or the master node detects that the replacement device is a replacement for a failed switch (e.g., switch 115) by receiving the packets sent from the replacement device.

In this example, backup device 105 sends backup data of switch 115 to replacement device 175 via simple link 145 and special link 140. Upon receiving the backup data of switch 115, replacement device 175 automatically configures itself based on the backup data of switch 115 to continue performing the same or similar functionalities as switch 115 (e.g., by re-implementing the state of failed switch 115). In this manner, the operation of management network 100 is maintained. In some embodiments, backup device 105 sends the backup data of switch 115 to master node 110. Master node 110 then forwards the backup data of switch 115 to replacement device 175 and instructs replacement device 175 to configure itself using the backup data of switch 115.

FIGS. 1A-1C, 2, 3A, 3B, and 4A-4C illustrate one topology of a management network. It is appreciated that a management network in different embodiments may include any number of additional and/or different nodes connected in any number of different ways. For example, in some embodiments, management network 100 may include backup device 105, master node 110 and switches 115, 120, and 125 while switches 130 and 135 may be unmanaged switches (e.g., switches that require little to no configuration to operate, plug and play switches, etc.) that are not part of management network 110 and, thus, are not managed by master node 110. Additionally, FIGS. 1A-1C, 2, 3A, 3B, and 4A-4C show a master node and a backup device as separate nodes in a management network. It is appreciated that a master node and a backup device may be implemented as a single node, in some embodiments.

Figure 5:
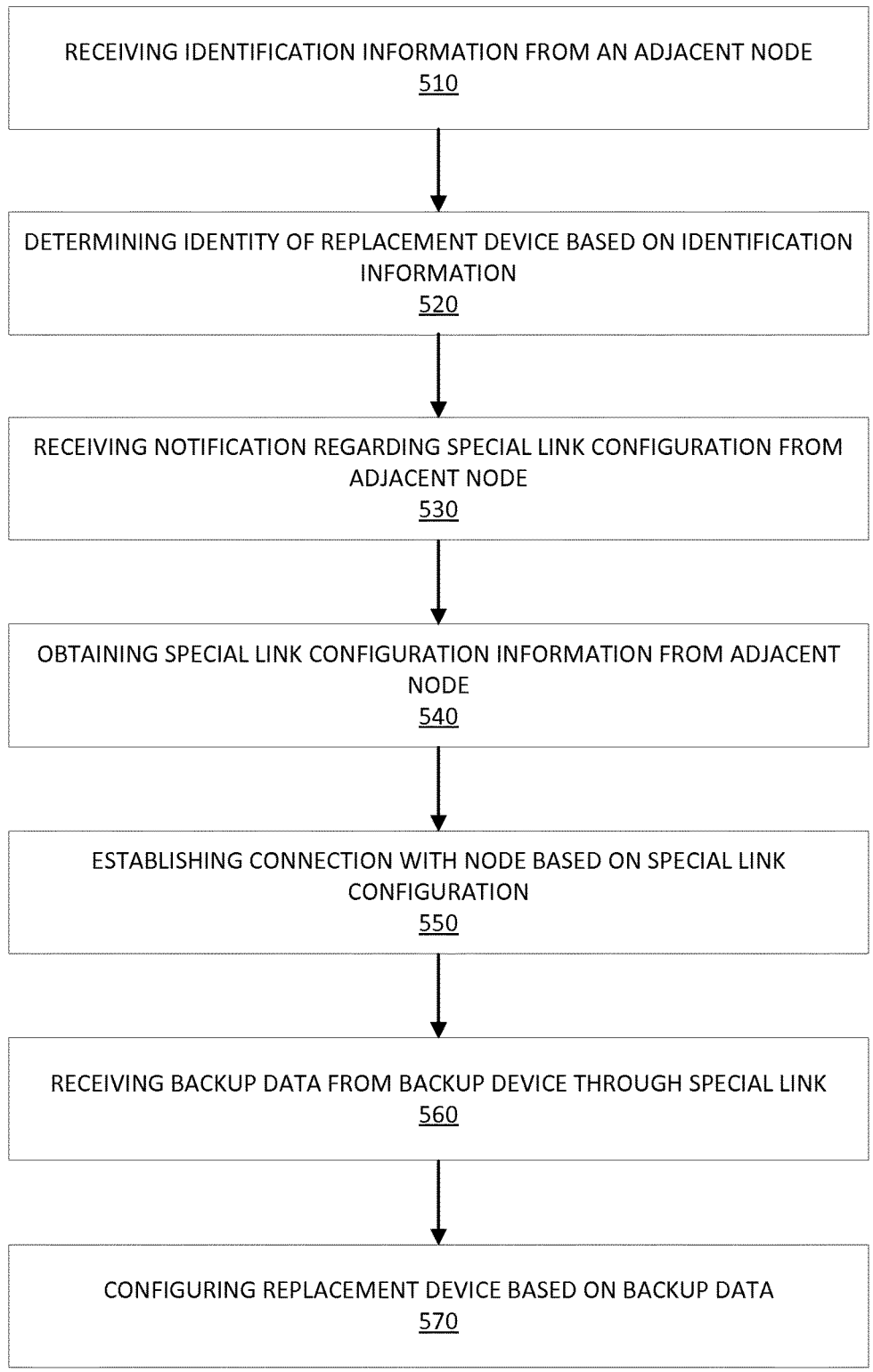
FIG. 5 shows a flow diagram for configuring a device added to a management network in accordance with some embodiments.

FIG. 5 shows a flow diagram 500 for automatically configuring a device added to a management network without human intervention in accordance with some embodiments. In some embodiments, a device (e.g., switch 175) that replaces a failed management network device (e.g., switch 115) performs the operations described in FIG. 5. At step 510, identification information is received from an adjacent node. In some embodiments, the adjacent node sends the identification information in response to detecting that the recipient is a replacement device for a failed node. The identification information indicates that the recipient (e.g., the replacement device) is a replacement for a failed node in a management network, in some embodiments.

At step 520, the replacement device determines its identity based on the identification information. As mentioned, in some embodiments, the identification information indicates that the recipient (e.g., the replacement device) is a replacement for a failed node in a management network. At step 530, the replacement device receives a notification regarding a special link configuration from the adjacent node. In some embodiments, the notification indicates that special link configuration information is available at the adjacent node.

At step 540, special link configuration information is obtained from the adjacent node. In some embodiments, the special link configuration information is obtained by sending a request to the adjacent node for the special link configuration information and receiving the requested special link configuration information from the adjacent node. At 550, the replacement device establishes a connection with a node in the management network based on the special link configuration information. Referring to FIG. 4B as an example, replacement device 175 establishes special link 140 with master node 110 using the special link configuration information received from switch 125.

At 560, the replacement device receives backup data of a failed node from a backup device through the established special link. Referring to FIG. 4C as an example, replacement switch 175 receives backup data of failed switch 115 from backup device 105 via simple link 145 and special link 140. In some embodiments, the backup data may be a backup image of a device that has failed (e.g., switch 115).

At 570, the replacement device is configured based on the received backup data. In some embodiments, the replacement device is configured in response to a command from the backup device to reconfigure itself using the backup data. Where the backup data is a backup image of a device, the replacement device may be configured by performing a restore operation on the replacement device with the backup image. The replacement device may reboot in response to the completion of the configuration of the replacement device.

Figure 6:
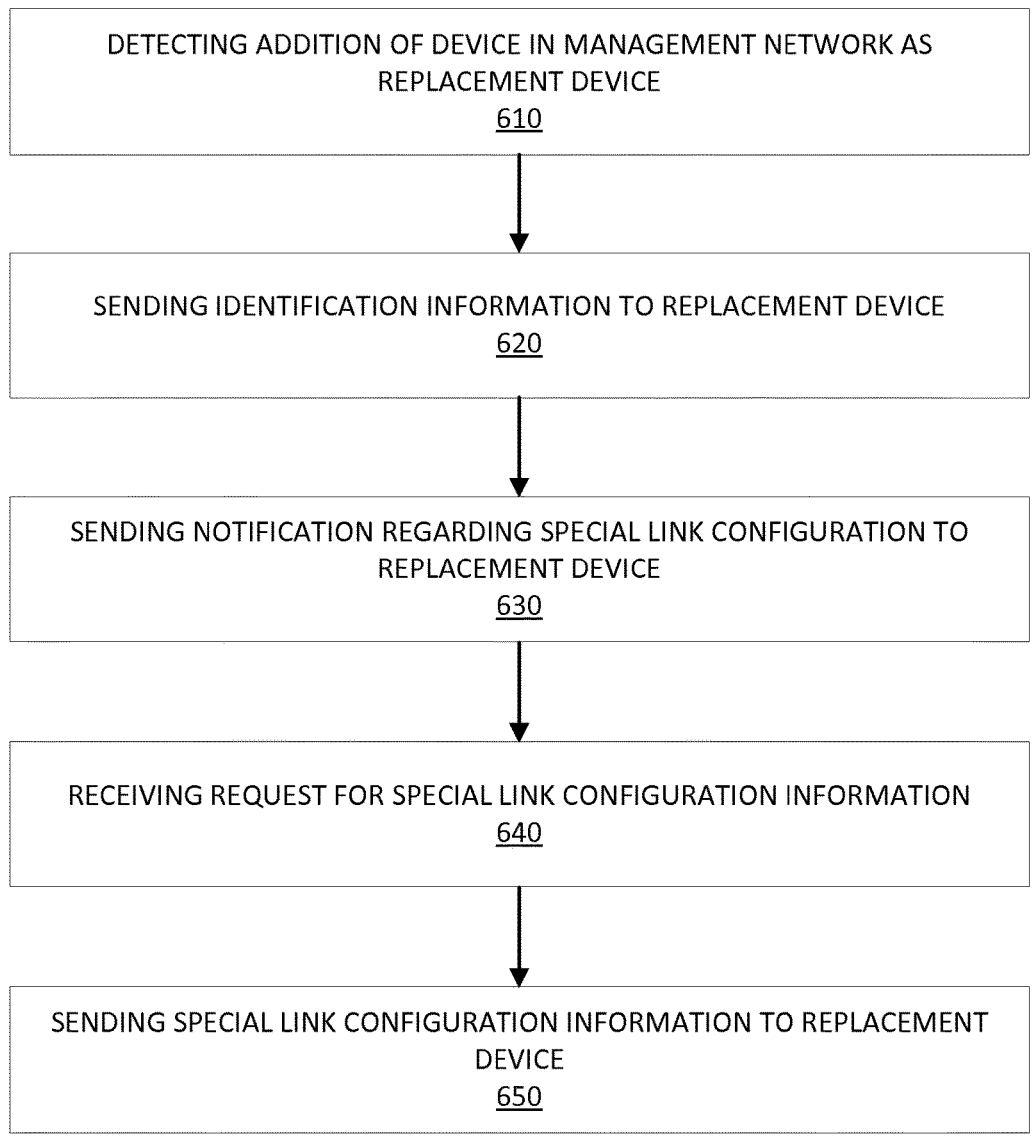
FIG. 6 shows a flow diagram for distributing special link information a device added to a management network in accordance with some embodiments.

FIG. 6 shows a flow diagram 600 for distributing special link information a device added to a management network in accordance with some embodiments. In some embodiments, a device (e.g., switch 120, switch 125, etc.) that is connected via simple links to a replacement device (e.g., switch 175) performs the operations described in FIG. 6. At step 610, a node (e.g., an adjacent node) detects the addition of a device as a replacement device. Referring to FIG. 4B as an example, switch 125 detects that replacement device 175 is a replacement for failed switch 115.

At 620, the node sends identification information to the replacement device. As explained above, in some embodiments, the identification information indicates that the replacement device is a replacement for a failed node in a management network. At 630, a notification regarding a special link configuration is sent to the replacement device. In some embodiments, the notification indicates that special link configuration information is available.

At 640, the node receives a request for special link configuration information. In response to the request, special link configuration information associated with the failed node is identified. At 650, the node sends special link configuration information to the replacement device. In some embodiments, the special link configuration information is sent by retrieving (e.g., from a storage) the identified special link configuration information.

Figure 7:
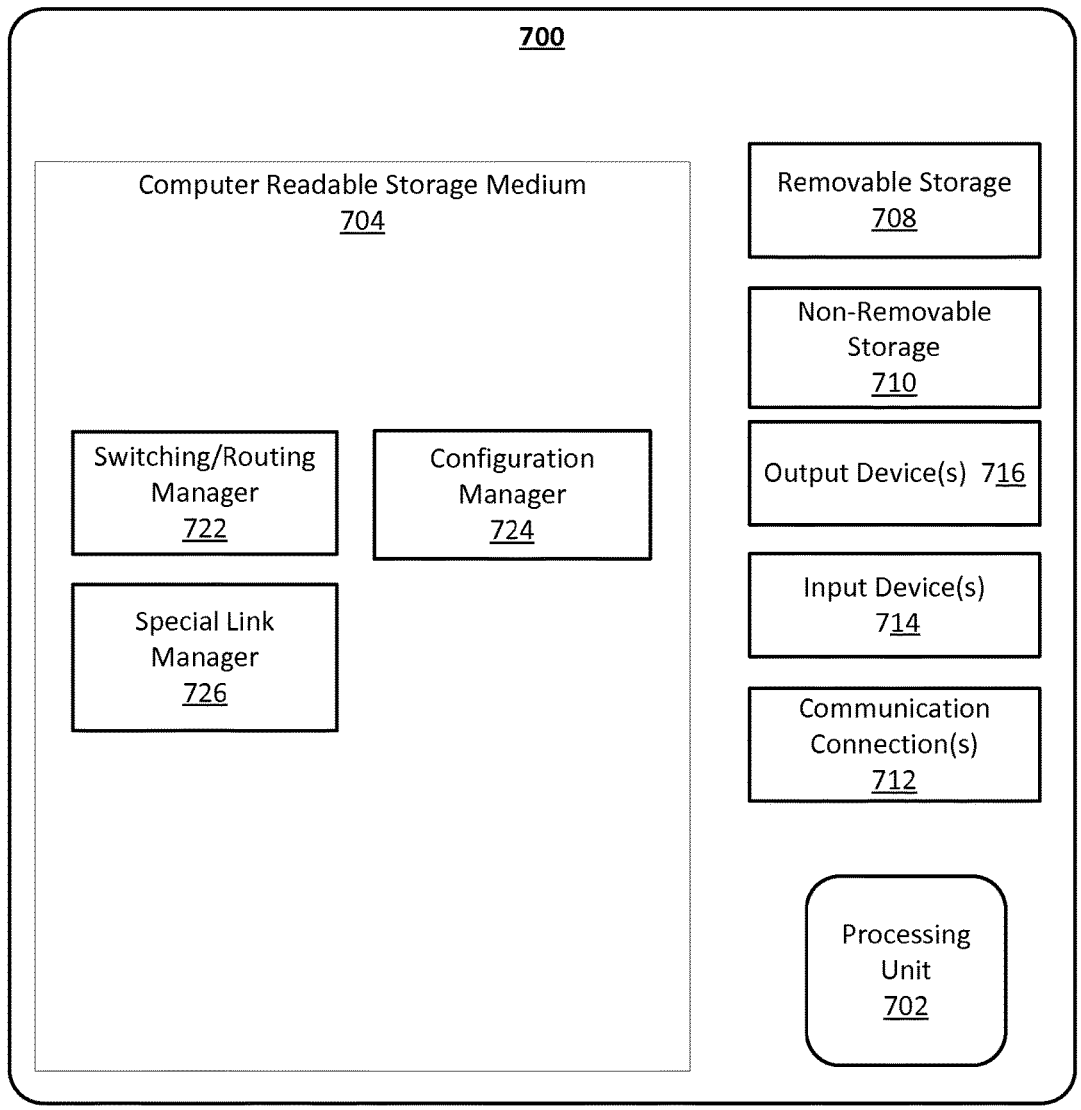
FIG. 7 shows a computer system in accordance with some embodiments.

Referring now to FIG. 7, a block diagram of a computer system in accordance with some embodiments is shown. With reference to FIG. 7, a system module for implementing embodiments includes a general purpose computing system environment, such as computing system environment 700. Computing system environment 700 may include, but is not limited to, servers, switches, routers, desktop computers, laptops, tablets, mobile devices, and smartphones. In its most basic configuration, computing system environment 700 typically includes at least one processing unit 702 and machine readable storage medium 704. Depending on the exact configuration and type of computing system environment, machine readable storage medium 704 may be volatile (such as RAM), non-volatile (such as ROM, flash memory, etc.) or some combination of the two. Portions of machine readable storage medium 704 when executed facilitate the forwarding/routing of network data through a management network, the management of backup data of nodes in the management network, the restoration of such nodes based on the backup data, the distribution of special link configuration information, and establishing special links based on the special link configuration information.

Additionally, in various embodiments, computing system environment 700 may also have other features/functionality. For example, computing system environment 700 may also include additional storage (removable and/or non-removable) including, but not limited to, magnetic or optical disks or tape. Such additional storage is illustrated by removable storage 708 and non-removable storage 710. Computer storage media includes volatile and nonvolatile, removable and non-removable media implemented in any method or technology for storage of information such as machine readable instructions, data structures, program modules or other data. Machine readable medium 704, removable storage 708 and nonremovable storage 710 are all examples of computer storage media. Computer storage media includes, but is not limited to, RAM, ROM, EEPROM, flash memory or other memory technology, expandable memory (e.g., USB sticks, compact flash cards, SD cards), CD-ROM, digital versatile disks (DVD) or other optical storage, magnetic cassettes, magnetic tape, magnetic disk storage or other magnetic storage devices, or any other medium which can be used to store the desired information and which can be accessed by computing system environment 700. Any such computer storage media may be part of computing system environment 700.

In some embodiments, computing system environment 700 may also contain communications connection(s) 712 that allow it to communicate with other devices. Communications connection(s) 712 is an example of communication media. Communication media typically embodies machine readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term machine readable media as used herein includes both storage media and communication media.

Communications connection(s) 712 may allow computing system environment 700 to communicate over various networks types including, but not limited to, fibre channel, small computer system interface (SCSI), Bluetooth, Zigbee, Z-Wave, Ethernet, Wi-fi, Infrared Data Association (IrDA), Local area networks (LAN), Wireless Local area networks (WLAN), wide area networks (WAN) such as the internet, serial, and universal serial bus (USB). It is appreciated the various network types that communication connection(s) 712 connect to may run a plurality of network protocols including, but not limited to, transmission control protocol (TCP), user datagram protocol (UDP), internet protocol (IP), real-time transport protocol (RTP), real-time transport control protocol (RTCP), file transfer protocol (FTP), and hypertext transfer protocol (HTTP).

In further embodiments, computing system environment 700 may also have input device(s) 714 such as keyboard, mouse, a terminal or terminal emulator (either connected or remotely accessible via telnet, SSH, http, SSL, etc.), pen, voice input device, touch input device, remote control, etc. Output device(s) 716 such as a display, a terminal or terminal emulator (either connected or remotely accessible via telnet, SSH, http, SSL, etc.), speakers, light emitting diodes (LEDs), etc. may also be included. All these devices are well known in the art and are not discussed at length.

In one embodiment, machine readable storage medium 704 includes a network switching/routing manager module 722, a configuration manager module 724, and a special link manager module 726. The network switching/routing manager module 722 is operable to handle switching and routing of network data through a management network. The configuration manager module 724 may be used to generate backup data to transmit to a backup device and to generate configurations based on backup data. The special link manager module 726 operates to handle distributing special link configuration information and establishing special links based on such information.

It is appreciated that implementations according to some embodiments that are described with respect to a computer system are merely exemplary and not intended to limit the scope of the embodiments. For example, some embodiments may be implemented on devices such as switches and routers, which may contain application specific integrated circuits (ASICs), field programmable gate arrays (FPGAs), etc. It is appreciated that these devices may include a machine readable medium for storing instructions for implementing methods according to flow diagrams 500 and 600.

Figure 8:
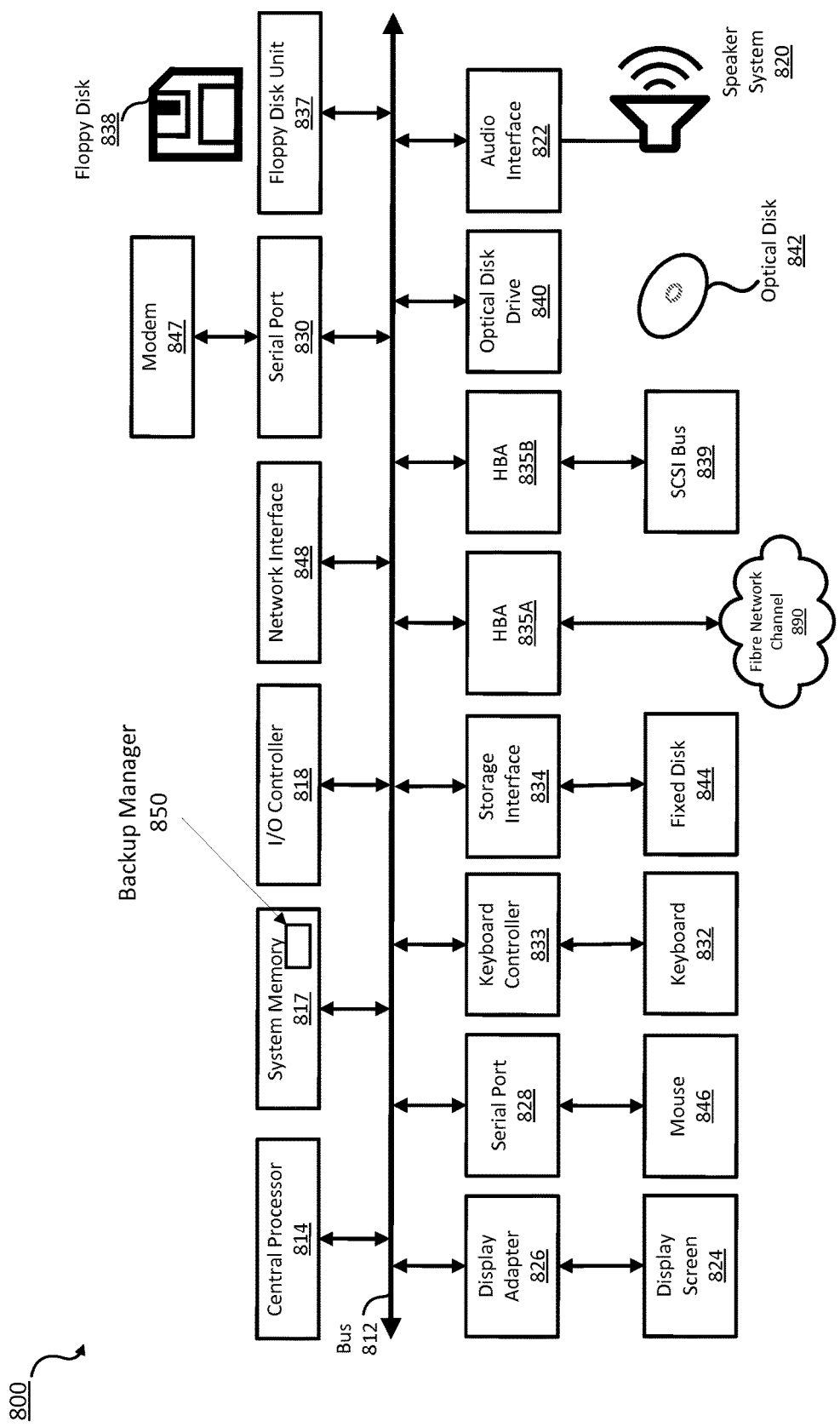
FIG. 8 shows a block diagram of a computer system in accordance with some embodiments.

Referring now to FIG. 8, a block diagram of another exemplary computer system in accordance with some embodiments is shown. FIG. 8 depicts a block diagram of a computer system 810 suitable for implementing the present disclosure. Computer system 810 includes a bus 812 which interconnects major subsystems of computer system 810, such as a central processor 814, a system memory 817 (typically RAM, but which may also include ROM, flash RAM, or the like), an input/output controller 818, an external audio device, such as a speaker system 820 via an audio output interface 822, an external device, such as a display screen 824 via display adapter 826, serial ports 828 and 830, a keyboard 832 (interfaced with a keyboard controller 833), a storage interface 834, a floppy disk drive 837 operative to receive a floppy disk 838, a host bus adapter (HBA) interface card 835A operative to connect with a Fibre Channel network 890, a host bus adapter (HBA) interface card 835B operative to connect to a SCSI bus 839, and an optical disk drive 840 operative to receive an optical disk 842. Also included are a mouse 846 (or other point-and-click device, coupled to bus 812 via serial port 828), a modem 847 (coupled to bus 812 via serial port 830), and a network interface 848 (coupled directly to bus 812). It is appreciated that the network interface 848 may include one or more Ethernet ports, wireless local area network (WLAN) interfaces, Bluetooth interfaces, Zigbee interfaces, Z-Wave interfaces, etc., but are not limited thereto. System memory 817 includes a backup manager module 850 which is operable to perform operations related to backing up of nodes in management networks. According to one embodiment, the backup manager module 850 may include other modules for carrying out various tasks. For example, the backup manager module 850 may include a network switching/routing manager module 722, a configuration manager module 724, and a special link manager module 726, as discussed with respect to FIG. 7 above. It is appreciated that the backup manager module 850 may be located anywhere in the system and is not limited to the system memory 817. As such, residing of the backup manager module 850 within the system memory 817 is merely exemplary and not intended to limit the scope of the embodiments. For example, parts of the backup manager module 850 may reside within the central processor 814 and/or the network interface 848 but are not limited thereto.

Bus 812 allows data communication between central processor 814 and system memory 817, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. Applications resident with computer system 810 are generally stored on and accessed via a machine readable medium, such as a hard disk drive (e.g., fixed disk 844), an optical drive (e.g., optical drive 840), a floppy disk unit 837, or other storage medium. Additionally, applications can be in the form of electronic signals modulated in accordance with the application and data communication technology when accessed via network modem 847 or interface 848.

Storage interface 834, as with the other storage interfaces of computer system 810, can connect to a standard machine readable medium for storage and/or retrieval of information, such as a fixed disk drive 844. Fixed disk drive 844 may be a part of computer system 810 or may be separate and accessed through other interface systems. Network interface 848 may provide multiple connections to other devices. Furthermore, modem 847 may provide a direct connection to a remote server via a telephone link or to the Internet via an internet service provider (ISP). Network interface 848 may provide one or more connection to a data network, which may include any number of networked devices. It is appreciated that the connections via the network interface 848 may be via a direct connection to a remote server via a direct network link to the Internet via a POP (point of presence). Network interface 848 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 8 need not be present to practice the present disclosure. The devices and subsystems can be interconnected in different ways from that shown in FIG. 8. The operation of a computer system such as that shown in FIG. 8 is readily known in the art and is not discussed in detail in this application. Code to implement the present disclosure can be stored in machine-readable storage media such as one or more of system memory 817, fixed disk 844, optical disk 842, or floppy disk 838. The operating system provided on computer system 810 may be MS-DOS®, MS-WINDOWS®, OS/2®, UNIX®, Linux®, or any other operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present disclosure may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

The foregoing description, for purpose of explanation, has been described with reference to specific embodiments. However, the illustrative discussions above are not intended to be exhaustive or to limit the embodiments disclosed. Many modifications and variations are possible in view of the above teachings.

What is claimed is:

1. A system comprising:
    a backup device; and
    a plurality of switches coupled to the backup device, wherein a switch in the plurality of switches is coupled to the backup device using at least a special link,
    wherein the at least the special link is configured by a replacement device when the switch in the plurality of switches coupled to the backup device using the at least the special link fails, the failed switch is replaced with the replacement device, and the replacement device receives configuration data associated with the at least the special link from another switch of the plurality of switches via a simple link,
    wherein the simple link allows communication of data without configuration of the simple link, wherein the backup device is configured to manage backup data associated with the plurality of switches.

2. The system as described in claim 1 further comprising the replacement device for replacing the failed switch.

3. The system as described in claim 2, wherein the replacement device is configured to receive backup data of the failed switch in the plurality of switches from the backup device.

4. The system as described in claim 3, wherein the replacement device is further configured to automatically configure itself without human intervention based on the backup data of the failed switch in the plurality of switches.

5. The system as described in claim 1 further comprising a master node configured to manage the plurality of switches.

6. The system as described in claim 1, wherein the another switch in the plurality of switches is configured to send the configuration information regarding the special link to the replacement device in response to addition of the replacement device to the system.

7. The system as described in claim 6, wherein the addition of the replacement device to the system comprises plugging connections coupled to the switch in the plurality of switches into the replacement device and powering on the replacement device.

8. The system as described in claim 1, wherein the backup device manages the backup data of the plurality of switches by requesting the backup data from the plurality of switches and storing the backup data for later retrieval.

9. The system as described in claim 1, wherein the special link is a link established using a link aggregation control protocol (LACP).

10. The system as described in claim 1, wherein the special link is a link established using a layer 2 tunneling protocol (L2TP).

11. The system as described in claim 1, wherein the backup device and the plurality of switches are part of a network that is a loop-free broadcast domain.

12. The system as described in claim 1, wherein the backup data associated with the plurality of switches comprises configuration data, firmware data, and licensing data.

13. A device comprising:
    a first interface for connecting to an adjacent node in a management network via a simple link, wherein the first interface is further for obtaining configuration information regarding a special link from the adjacent node, wherein the special link is a link that is configured before data is communicated over the special link; and
    a second interface for establishing the special link with a node in the management network based on the configuration information regarding the special link, wherein the second interface is further for receiving backup data of a failed node in the management network from a backup device in the management network, and wherein the second interface is further for configuring the device to operate as the failed node in the management network based on the backup data of the failed node.

14. The device as described in claim 13, wherein the first interface is further for receiving identification information from the adjacent node, and wherein the device determines that the device is a replacement for the failed node in the management network.

15. The device as described in claim 13, wherein the first interface is further for receiving a notification that the configuration information regarding the special link is available from the adjacent node, wherein the configuration information regarding the special link is obtained in response to the notification.

16. The device as described in claim 13, wherein the configuring the device comprises automatically configuring the device without human intervention.

17. The device as described in claim 13, wherein the device and the adjacent node are connected via a link that allows communication of data over the link without configuration of the link.

18. A method comprising:
    detecting an addition of a device in a management network as a replacement device for a failed node in the management network;
    sending identification information to the device indicating that the device is a replacement for the failed node;
    sending a notification that configuration information regarding a special link is available from a node, wherein the special link is a link along a path between the device and a backup device in the management network that is configured before data is communicated over the special link; and
    sending the configuration information regarding the special link to the device, wherein the configuration information regarding the special link is for the device to establish the special link to allow communication with the backup device.

19. The method as described in claim 18, wherein the method further comprises receiving a request for the configuration information regarding the special link, wherein the configuration information regarding the special link is sent in response to the request.

20. The method as described in claim 18 further comprising receiving the configuration information regarding the special link from the failed node before failure of the failed node.

* * * * *